United States Patent
Schilling et al.

(10) Patent No.: US 11,688,524 B2
(45) Date of Patent: *Jun. 27, 2023

(54) PACKAGING SYSTEM FOR RADIOACTIVE WASTE

(71) Applicant: PacTec, Inc., Clinton, LA (US)

(72) Inventors: Michael Schilling, Clinton, LA (US); Michael Sanchez, Clinton, LA (US); Troy Town, Clinton, LA (US); William Smart, Knoxville, TN (US)

(73) Assignee: PacTec, Inc., Clinton, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,163

(22) Filed: Mar. 8, 2022

(65) Prior Publication Data

US 2022/0199275 A1    Jun. 23, 2022

Related U.S. Application Data

(62) Division of application No. 16/160,468, filed on Oct. 15, 2018, now Pat. No. 11,289,235.

(51) Int. Cl.
| | | |
|---|---|---|
| *G21F 9/36* | (2006.01) | |
| *G21F 5/00* | (2006.01) | |
| *G21F 5/005* | (2006.01) | |

(52) U.S. Cl.
CPC ............... *G21F 9/36* (2013.01); *G21F 5/005* (2013.01)

(58) Field of Classification Search
CPC .................................. G21F 9/36; G21F 9/005
USPC ......... 250/505.1, 506.1, 507.1, 515.1, 516.1, 250/517.1, 518.1, 519.1
See application file for complete search history.

(56) References Cited

U.S. PATENT DOCUMENTS

| | | |
|---|---|---|
| 6,450,356 B1 | 9/2002 | Alexander et al. |
| 7,073,676 B1 | 7/2006 | Town |
| 7,074,174 B2 | 7/2006 | Lindgren et al. |
| 8,129,702 B2 | 3/2012 | Bakker et al. |
| 8,777,034 B1 | 7/2014 | Town |
| 8,894,281 B2 | 11/2014 | Town et al. |
| 8,894,282 B2 | 11/2014 | Town et al. |
| 9,365,345 B2 | 6/2016 | Town et al. |
| 9,478,322 B1 | 10/2016 | Schilling et al. |
| 9,679,669 B2 | 6/2017 | Schilling et al. |
| 11,289,235 B2 * | 3/2022 | Schilling ................ B32B 27/12 |
| 2017/0040073 A1 | 2/2017 | Schilling et al. |

FOREIGN PATENT DOCUMENTS

KR    20160000592 U    2/2016

OTHER PUBLICATIONS

49 CFR § 173.412—Additional design requirements for Type A packages, 2 pages.

(Continued)

*Primary Examiner* — Nicole M Ippolito
(74) *Attorney, Agent, or Firm* — Jones Walker LLP

(57) ABSTRACT

A method of packaging a radioactive waste including the steps of: (a) providing a containment enclosure having (i) an outer polymeric fabric layer and (ii) an inner polymeric fabric layer, wherein the outer and inner polymeric fabric layers are thermally stable to −40° F.; (b) placing a radioactive waste within the inner polymeric fabric layer; and (c) closing an outer closeable flap on the outer polymeric fabric layer.

25 Claims, 3 Drawing Sheets

(56) References Cited

OTHER PUBLICATIONS

49 CFR § 173.465—Type A packaging tests, 2 pages.
49 CFR § 171.8-171.12—Definitions and abbreviations, 22 pages.
"Plastics Glass Transition Temperature (Tg) Definition & Values" (Omnexus), May 8, 2017.

* cited by examiner

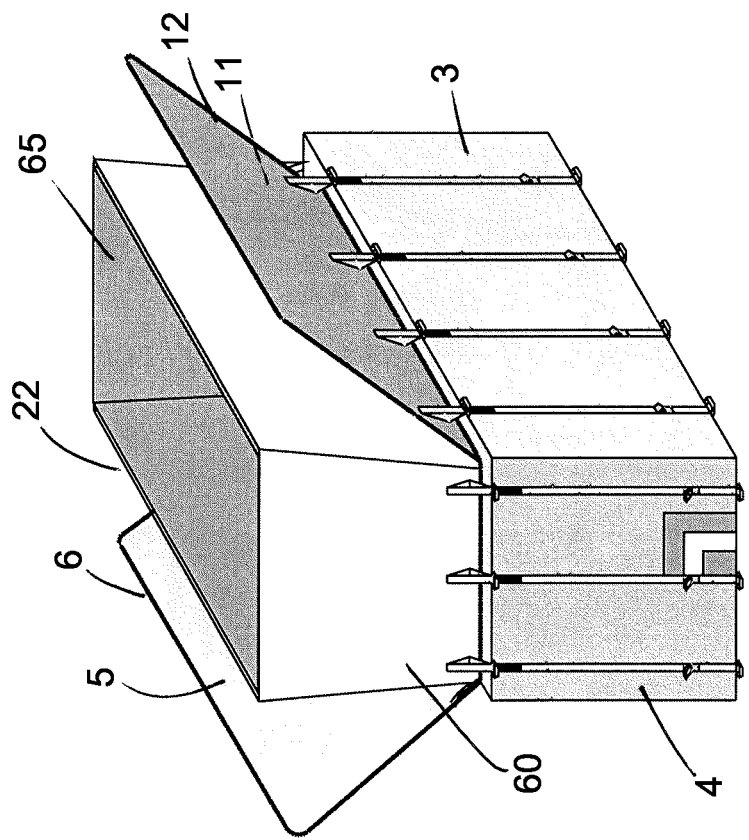
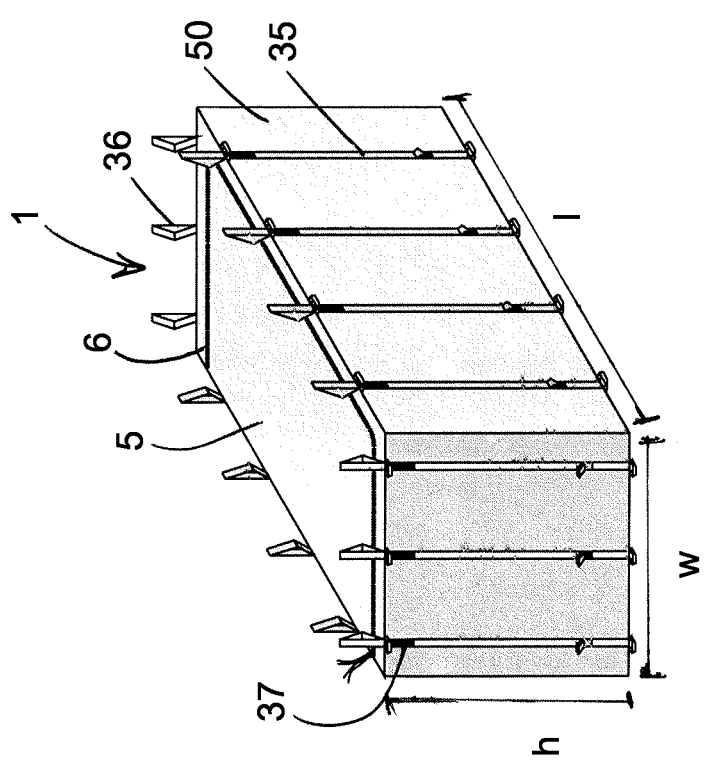
FIG. 1B
FIG. 1A

PACKAGING SYSTEM FOR RADIOACTIVE WASTE

CROSS-REFERENCE TO RELATED APPLICATION

This application is a divisional of U.S. application Ser. No. 16/160,468, filed Oct. 15, 2018, which is incorporated by reference herein in its entirety.

BACKGROUND OF INVENTION

The present invention relates to methods and apparatuses for packaging or containerizing low level radioactive-containing materials in preparation for transportation and disposal.

Low-level radioactive waste includes items that have become contaminated with radioactive material or have become radioactive through exposure to neutron radiation. This waste typically consists of contaminated protective shoe covers and clothing, wiping rags, mops, filters, reactor water treatment residues, equipment and tools including nuclear decommissioning materials such as contaminated sand, soil, gravel and construction debris, luminous dials, medical tubes, swabs, injection needles, syringes, and laboratory animal carcasses and tissues. The radioactivity can range from just above background levels found in nature to very highly radioactive in certain cases, such as parts from inside the reactor vessel in a nuclear power plant. Low-level waste is typically stored on-site by licensees, either until it has decayed away and can be disposed of as ordinary waste, or until amounts are large enough for shipment to a low-level waste disposal site in containers approved by the Department of Transportation.

These types of low-level radioactive contaminated materials are generally disposed of in landfills, but the contaminated solid materials have to be properly "packaged" for disposal to reduce the potential for spread of contamination by leachate. While the materials of concern are solid materials (as opposed to liquid), some entrained liquids may be present in the materials. In the following, the materials are understood to be such solid low level radioactive contaminated wastes ("LLW") as classified by the Department of Energy (DOE) and the Nuclear Regulatory Commission (NRC). See for example, 49 CFR § 171.8 et seq.

The US Department of Transportation (DOT) and the International Atomic Energy Agency (IAEA) have approved, respectively, the Type A and Industrial Package 3 (IP-3) packaging for transport of LLW. Type A packaging is used to transport small quantities of radioactive material with higher concentrations of radioactivity and the IP-3 is used to ship wastes in which the radioactive material is distributed throughout a solid or a collection of solid objects, or is essentially uniformly distributed in a solid compact binding agent (such as concrete, bitumen, ceramic, etc.). These packages are typically constructed of steel. Type A and IP-3 packaging and its radioactive contents must meet standard testing requirements designed to ensure that the package retains its containment integrity and shielding under normal transport conditions. Requirements for Type A and IP-3 packaging are addressed in 49 CFR 173.412. Type A and IP-3 Packages must withstand moderate degrees of heat, cold, reduced air pressure, vibration, impact, water spray, drop, penetration, and stacking tests. Type A and IP-3 Packages are not, however, designed to withstand the forces of an accident. The consequences of a release of the material in one of these packages would not be significant since the quantity of material in this package is so limited. Type A and IP-3 packaging are only used to transport non-life-endangering amounts of radioactive material. As used herein, "LLW" is distinguished from "Mixed Waste" which is a mixture of radioactive waste and "hazardous" waste (i.e., a waste classified as hazardous for reasons other than radioactivity). LLW will be waste which is not considered as hazardous by regulatory authorities for any characteristic other than radioactivity.

SUMMARY OF SELECTED EMBODIMENTS

One embodiment of the invention is a containment enclosure having a dual layer outer polymeric fabric combination including (i) a first polymeric layer, and (ii) a non-woven second polymeric layer thermally stable to −40° F. The enclosure further has an inner polymeric fabric combination positioned within the outer polymeric fabric combination, the inner polymeric fabric combination including (i) a substantially impermeable third polymeric seal (IPS) layer, and (ii) a non-woven fourth polymeric layer.

Another embodiment is a method of packaging a radioactive waste. The method first provides a containment enclosure comprising (i) a dual layer outer polymeric fabric combination including (1) a first polymeric layer, and (2) a non-woven second polymeric layer; and (ii) an inner polymeric fabric combination positioned within the outer polymeric fabric combination, the inner polymeric fabric combination including (1) a substantially impermeable third polymeric seal (IPS) layer, and (2) a non-woven fourth polymeric layer; wherein the first, second, third, and fourth polymeric layers are thermally stable to −40° F. Then a low level radioactive waste (LLW) is placed within the fourth layer of the inner polymeric fabric combination; and finally, an outer closeable flap on the outer polymeric fabric combination is closed.

BRIEF DESCRIPTION OF DRAWINGS

FIG. 1A is a perspective view of one embodiment of the containment bag or enclosure of the present invention having a U-shaped zipper.

FIG. 1B shows the containment bag of FIG. 1A, but with closing flaps open and the inner polymeric fabric combinations partially removed from the containment bag.

DETAILED DESCRIPTION

Figure 2A:
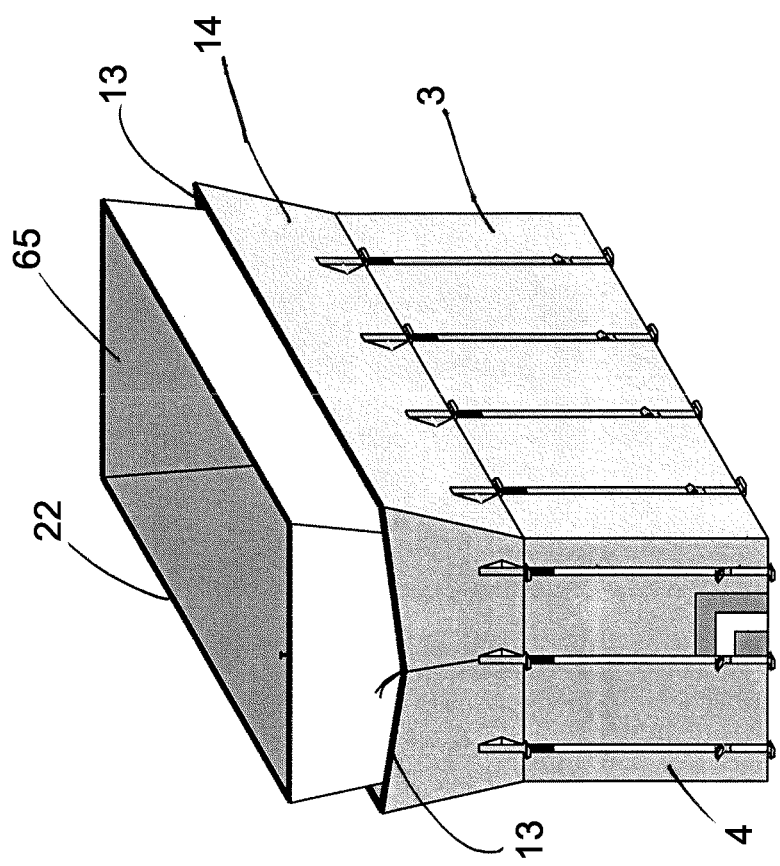
FIG. 2A is a perspective view of another embodiment of the containment bag or enclosure having a center zipper.

Many embodiments of the present invention relate to enclosures or bags formed of one or more polymeric textiles or fabrics. These polymeric "fabrics" can be any sheet-like polymeric materials produced by virtually any technique, including both woven polymeric fabrics and nonwoven polymeric fabrics. Woven polymeric fabrics typically consist of monofilament, multifilament, slit-film and/or fibrillated slit-film yarns that are woven into a fabric on conventional fabric weaving machinery using a wide variety of traditional, as well as proprietary, weaving patterns. Nonwoven polymeric fabrics consist of fibers that are continuous filament or short staple fibers. These fibers are then bonded together by various processes that can include a needling process that intertwines the fibers physically (needlepunched), or a chemical/thermal bonding operation that fuses adjacent fibers together.

In many instances, polymeric "coatings" or "films" will be applied to one surface or the other (or both surfaces) of polymeric fabrics. Polymeric "coatings" are normally created by applying a thin layer of molten coating polymer to another surface, e.g., a polymeric fabric. Polymeric "films" are normally a separately formed thin layer of polymeric material which is then adhered to (e.g., laminated onto) the surface of another material (such as a polymeric fabric).

A particular polymeric fabric will sometimes be characterized as having a certain weight or mass per unit area, typically in terms of ounces per square yard, for example, a 12 oz/yd$^2$ non-woven polypropylene, which may be shortened to "12 oz" non-woven polypropylene (the area dimension being understood if not stated). However, at other times, a polymeric fabric may simply be described in terms of its thickness, e.g., 12 mil reinforced polyethylene or a 3 mil polyethylene coating. Although polymeric fabrics may be described in terms of either mass per area or thickness, those skilled in the art can readily convert between these units for a given material.

Often containers or bags formed of polymeric fabrics will include multiple discrete layers of the same or different materials. In many of these multi-layer bags, each layer is in essence a separate bag and may have a sidewall, a top portion, a bottom portion, a top edge (where the sidewall meets the top portion), and an opening flap (or flaps) along the top portion. The final assembled product results in a nested series of bags or layers. These bags may or may not be joined together, such as sewn together, heat welded together or adhesively bonded. Alternatively, it may be the case that one or more of the layers will be sewn or bonded together before being formed into the bag shape. One or more of the layers may have individual closing mechanisms, for example a zipper, or a "ziplock" type of closure device. Often, it is advantageous that each layer can be opened and closed independently from the other layers. Some preferred constructions have zippers (including ziploc type of toothless zipper closures) which traverse down the center of the top portion of each bag, much like the closable opening shown in U.S. Pat. No. 8,894,282, which is incorporated by reference in its entirety. Alternatively, the zipper may be along three sides of a rectangular closing flap (i.e., a "U-shaped" zipper) as shown in U.S. Pat. No. 8,777,034, which is also incorporated by reference in its entirety. Additionally, cardboard inserts may sometimes be provided to line the interior sidewalls to allow the assembled product to be self-standing.

FIGS. 1 and 2 illustrate one embodiment of containment enclosure or containment bag 1. In these embodiments, containment bag 1 is rectangular in shape with a width "w" of 5.5', a length "l" of 8', and a height "h" of 5.5'. Naturally, the shape and dimensions of containment bag 1 could vary greatly depending of the particular application requirements, with volumes of the containment bag as small as 1 yd$^3$ or as large as 40 yd$^3$ (including any sub-range in between).

FIGS. 1A and 1B also show this embodiment of containment bag 1 having a series of lifting straps 35 positioned on the outer surface of containment bag 1 and extending from one sidewall 3 of the bag to the opposing sidewall 3 of the bag (and likewise one end wall 4 to the opposing end wall 4). It can be seen that the lifting straps 35 have attachment loops 36 on each end which typically extend above the bag sidewalls. Lifting straps 35 will be held in place by strap retainers 37, but the lifting straps can slide within strap retainers 37, much as described in U.S. Pat. No. 9,365,345, which is incorporated by references herein in its entirety.

FIG. 1A suggests how a top closing (outer layer) flap 5 includes a U-shaped or three sided zipper 6 (shown in the closed position). One preferred zipper is a #10 coil nylon zipper, with two pulls positioned on the zipper tracks. However, other zipper sizes or zipper types could also be used.

Figure 3:
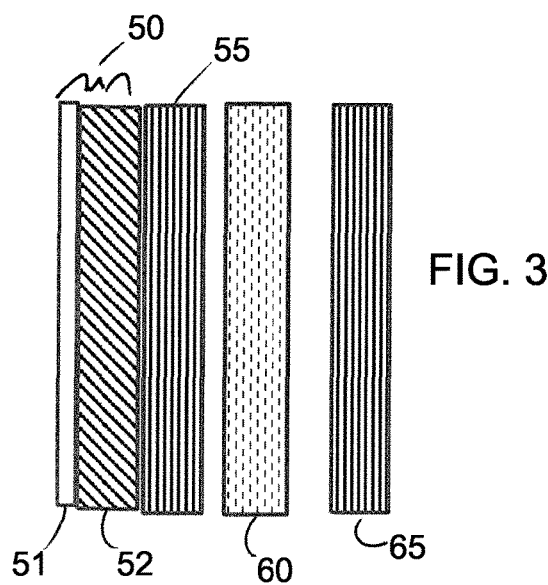
FIG. 3 shows a series of polymeric layers for a first embodiment of the containment bag.

In certain preferred embodiments, containment bag 1 is constructed to include an outer polymeric fabric combination and an inner polymeric fabric combination. FIG. 3 illustrates one example of fabric layers which could form this inner and outer fabric combination. The outer fabric combination includes a first polymeric layer 50 and a 6 to 45 oz (or any subrange in between) non-woven second polymeric layer 55, where the second polymeric layer 55 is thermally stable down to −40° F. The second layer is "thermally stable" in the sense that it does not significantly lose its strength characteristics or otherwise degrade at temperatures down to −40° F. First polymeric layer 50 and the non-woven second polymeric layer 55 are joined together with the nonwoven second polymeric layer oriented toward the interior of the bag (except for the top closures of the two layers as explained in more detail below). The two layers can be joined in any conventional manner, including sewing, laminating, heat welding or adhesive bonding. In the FIG. 3 embodiment, first polymeric layer 50 is a 12 to 30 mil thick woven polyethylene (WPE) layer 52 and second polymeric layer 55 is a 8 to 30 oz non-woven polyester (NWPET) layer. In a preferred embodiment, first layer 50 is 20 mils and second layer 55 is 16 oz. FIG. 3 also suggests how first layer 50 includes the 1 to 20 mil substantially impermeable coating or film 51 formed on the WPE layer 52. In a preferred embodiment, this coating or film is a 3 mil polyethylene coating. The polyethylene coating or film provides an outer surface which is more easily wiped down and decontaminated, i.e., contaminated particles are more likely to lodge between fibers on a woven or nonwoven surface than on a smoother coating or film surface. In many embodiments, a polymer layer is considered "substantially water impermeable" (or alternatively simply "water impermeable") when the layer is capable of passing a water spray test such as described in 49 CFR § 173.465 (which is incorporated by reference herein).

FIG. 3 also suggests how the inner polymeric fabric combination is positioned within the outer polymeric fabric combination (i.e., the right side of the layers being toward the interior of the bag). This inner polymeric fabric combination includes the 4 to 30 mil substantially impermeable third polymeric seal (IPS) layer 60 and the 6 to 45 oz non-woven fourth polymeric layer 65. The IPS third layer 60 can be formed of many different polymeric materials as long as those materials are substantially impermeable and are thermally stable down to −40° F. Nonlimiting examples of acceptable IPS materials include polyethylene and polyester. In a more preferred embodiment of the FIG. 3 design, the IPS third layer is an 8 to 10 mil polyethylene layer and the fourth polymeric layer is an 8 to 30 oz (most preferably 16 oz) non-woven NWPET layer. FIG. 3 also suggests how in more preferred embodiments, the outer polymeric fabric combination (i.e., layers 52 and 55) are joined to form a first bag-shaped enclosure. On the other hand, the space seen in FIG. 3 between layers 55 and 60, and between layers 60 and 65, suggests how the IPS third layer forms a second, separate bag-shaped enclosure, and the NWPET fourth layer forms a third separate bag-shaped enclosure. The three bags formed by combined layers 50/55 and separate layers 60 and 65 will be placed in a nested configuration as suggested by FIG. 1B. It will be understood that in many embodiments, all layers forming the containment enclosure (i.e., the overall multi-layered bag) will be of materials which are thermally stable down to at least −40° F.

Figure 2B:
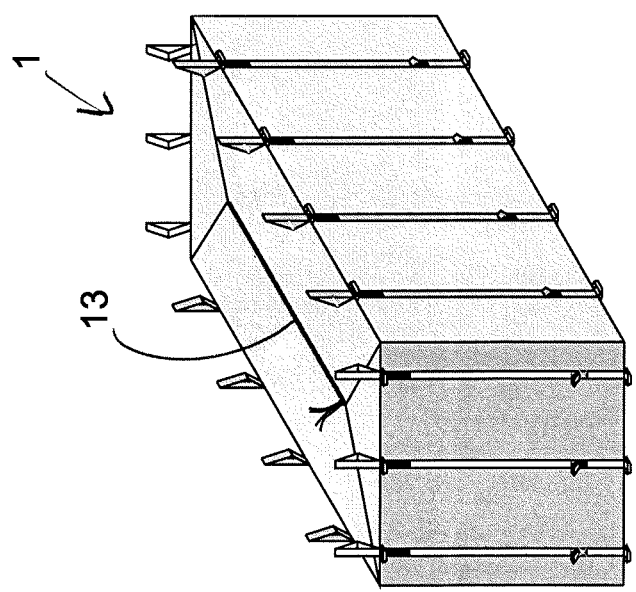
FIG. 2B shows the containment bag of FIG. 2A, but with closing flaps open and the inner polymeric fabric combinations partially removed from the containment bag.

FIG. 1B also suggests how first (outer) layer 50 will not only include the closing flap 5, but the second layer 55 will include its own closing flap 11 since the two layers are not joined along their closing flaps. Thus, closing flap 11 will include its own three-sided zipper 12, which closes in an opposing fashion to zipper 6. Although not explicitly shown, IPS third layer 60 will have a center zipper which is preferably air and water tight. Fourth layer 65 may or may not have a separate zipper closure. FIGS. 2A and 2B illustrate a similar containment bag 1, but having a center zipper 13 as described in U.S. Pat. No. 8,894,282 referenced above. FIGS. 2A and 2B suggest how the closeable flaps 14 of the bag can be formed as extensions of sidewalls 3 and end walls 4, with the zipper 13 extending along the perimeter of the closeable flap(s) which ultimately joins the flaps together down the top center of the bag. While the figures show zippers closing the closeable flaps of the containment bags, any conventional or future developed method of closing the bag flaps could be employed, including as nonlimiting examples, tie closures, Velcro® closures, or simply folding or "goose-necking" and tying off or taping the closable flaps 14 (with the procedure typically being followed for the flaps of each layer forming a separate bag).

Figure 4:
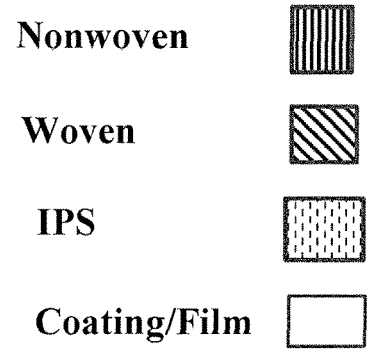
FIG. 4 shows a series of polymeric layers for a second embodiment of the containment bag.
Figure 4:
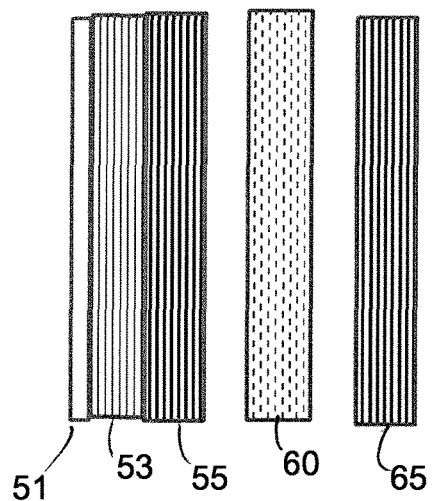
Figure 6:
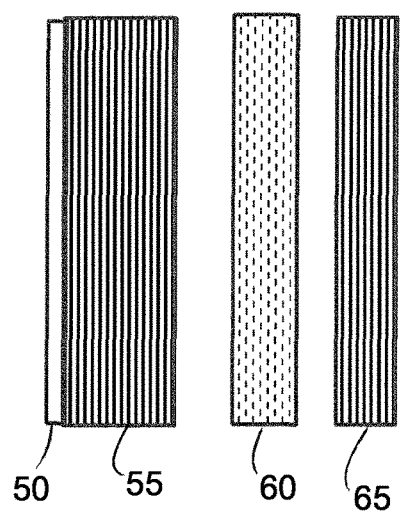
FIG. 6 shows a series of polymeric layers for a fourth embodiment of the containment bag.
Figure 5:
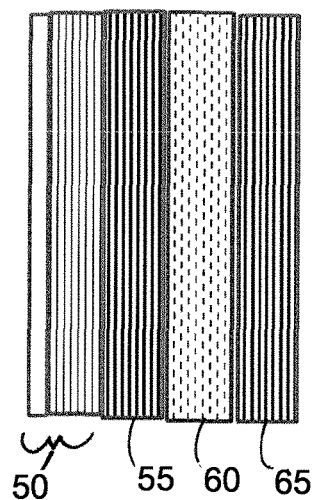
FIG. 5 shows a series of polymeric layers for a third embodiment of the containment bag.

FIGS. 4 to 6 illustrate further layer combinations which could be employed in creating containment bag 1. FIG. 4 suggests how the first layer is formed by nonwoven polymeric material 53 with coating or film 51. In one example, the nonwoven polymeric material 53 is a 12 oz nonwoven polyester (NWPET) layer with 3 mil polyethylene coating or film 51. The NWPET layer 53 is then joined to 16 oz NWPET second layer 55. As with the FIG. 3 embodiment, the IPS third layer 60 may be an 8 to 10 mil polyethylene layer and the fourth layer 65 is a 16 oz NWPET layer. Again, third layer 60 and fourth layer 65 form separate bag-shaped enclosures.

FIG. 5 shows a different embodiment where layers 60 and 65 are not separate bags, but all four layers 50, 55, 60, and 65 are joined together forming in essence a single bag. As previously described, the layers could be joined by any suitable conventional technique such as sewing, heat welding, or adhesive bonding. FIG. 6 illustrates a different embodiment where a 3 mil polyethylene coating forms the first layer 50. In this embodiment, second layer 55 could be a 25 to 60 oz (or any subrange in between) nonwoven layer and in a preferred embodiment, is a 30 oz NWPET layer. IPS third layer 60 may be a 4 to 30 mil polyethylene layer and the fourth layer 65 may be a 8 to 30 oz NWPET layer.

Although one embodiment of the present invention is a containment bag or enclosure apparatus, another embodiment is a method of using the containment bag. This method would generally include the steps of (i) providing a containment bag 1, placing a LLW material within the NWPET layer of the inner polymeric fabric combination; and closing the one or more closeable flaps on the different layers, e.g., separate nested fabric bags. Although one embodiment of this method involves placing of LLW material in the containment bag, other embodiments could involve the placement of other types of radioactive wastes (e.g., those not considered "low level" radioactive wastes) in the above described containment bags.

In certain method embodiments, the containment bag 1 is neither (i) positioned within an enclosed hardsided container by itself, nor (ii) positioned with an enclosed hardsided container within it. The polymer containment bag may be considered a flexible or "softsided" container. An "enclosed hardsided container" is a container with rigid walls which is enclosed on all sides, e.g., is not a container with an open top or an open side, and such enclosed hardsided containers are normally sized to receive a single bag for permanent disposal in combination with the container. For clarity, filling containment bags 1 with LLW material and then placing multiple containment bags in a railcar or truck-trailer for transportation would not be placing the bags inside a "enclosed hardsided container" because the railcar and truck-trailer are not design to hold a single bag nor to be disposed of with the bag.

This method could also include the steps of positioning containment bag 1 in a load frame (e.g., a custom sized open metal box) or placing light weight inserts (e.g., cardboard inserts) between the second and third layers in order to provide rigid sidewalls allowing the bag to be "self-standing." See for example, U.S. Pat. No. 9,478,322. A load frame is usually a rigid structure capable of holding the fabric containment bag in an open position, but the frame structure is generally not capable of completely enclosing the bag. For example, a construction dumpster having no closeable top could be a load frame. A more specialized load frame is the EZ Frame™ available from PacTec, Inc. of Clinton, La., but again, virtually any rigid structure capable of holding the fabric containment bags in an open position may serve as a load frame.

The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

The invention claimed is:

1. A radioactive waste containment enclosure comprising:
   (a) a dual layer outer polymeric fabric combination including (1) a first polymeric layer, and (2) a 6 to 45 oz non-woven second polymeric layer, wherein the first polymeric layer and the non-woven second polymeric layer are joined together;
   (b) an inner polymeric fabric combination positioned within the outer polymeric fabric combination, the inner polymeric fabric combination including (1) a 4 to 30 mil substantially impermeable third polymeric seal (IPS) layer, and (2) a 6 to 45 oz non-woven fourth polymeric layer; and
   (c) wherein the first, second, third and fourth polymeric layers are thermally stable to −40° F.

2. The containment enclosure of claim 1, wherein the nonwoven second and fourth polymeric layers are oriented toward the interior of the enclosure.

3. The containment enclosure of claim 1, wherein the first polymeric layer is a 10 to 30 mil thick woven polyethylene (WPE) layer with a 1 to 20 mil substantially impermeable coating or film formed thereon.

4. The containment enclosure of claim 3, wherein the second and fourth polymeric layers are a 8 to 30 oz non-woven polyester (NWPET) layer.

5. The containment enclosure of claim 1, wherein (i) the first polymeric layer includes a 1 to 10 mil substantially impermeable coating or film formed on the non-woven second polymeric layer and (ii) the non-woven second polymeric layer is at least 10 oz.

6. The containment enclosure of claim 1, wherein the IPS layer is not attached to the nonwoven fourth polymeric layer of the inner polymeric fabric combination.

7. The containment enclosure of claim 4, wherein the IPS layer is attached to the NWPET fourth layer of the inner polymeric fabric combination.

8. The containment enclosure of claim 1, wherein (i) the IPS layer is attached to the NWPET fourth layer of the inner polymeric fabric combination, and (ii) the IPS layer is attached to the NWPET second layer of the outer polymeric fabric combination.

9. The containment enclosure of claim 1, wherein (i) the outer polymeric fabric forms a first bag-shaped enclosure, (ii) the IPS third layer of the inner polymeric fabric combination forms a second bag-shaped enclosure, and (iii) the NWPET fourth layer of the inner polymeric fabric combination forms a third bag-shaped enclosure.

10. The containment enclosure of claim 1, wherein a plurality of lift straps positioned on an outer surface of the containment enclosure pass from one sidewall of the enclosure to an opposing sidewall of the enclosure, the lifting straps having attachments loops on each end.

11. The containment enclosure of claim 1, wherein the IPS third layer is formed substantially from polyethylene or polyester.

12. The containment enclosure of claim 4, wherein the NWPET layers are oriented toward the interior of the enclosure.

13. The containment enclosure of claim 10, wherein a strap retainer slidingly connects the lifting straps to an upper section of the sidewalls.

14. The containment enclosure of claim 4, wherein the IPS layer is not attached to the NWPET layer of the inner polymeric fabric combination.

15. A containment enclosure formed of at least three polymeric layers, the at least three layers comprising:
(i) an outer 6 to 45 oz woven or non-woven polymeric layer;
(ii) an inner 6 to 45 oz woven or non-woven polymeric layer;
(iii) a 4 to 30 mil substantially impermeable polymeric seal (IPS) layer between the outer and inner polymeric layers;
(iv) wherein all of the at least three polymeric layers are thermally stable to −40° F.

16. The containment enclosure of claim 15, wherein a water impermeable film is formed on an outer surface of the outer polymeric layer.

17. The containment enclosure of claim 16, wherein the water impermeable film is a 1 to 10 mil polyethylene film.

18. The containment enclosure of claim 15, wherein the outer and inner polymeric layers include a 8 to 30 oz non-woven polyester (NWPET) layer.

19. The containment enclosure of claim 18, wherein the IPS layer is substantially polyethylene or polyester.

20. The containment enclosure of claim 15, wherein the outer polymeric layer includes (i) a 8 to 30 oz non-woven polyester (NWPET) layer; (ii) a 10 to 30 mil thick woven polyethylene (WPE) layer; and a 1 to 20 mil substantially impermeable film on the WPE layer.

21. The containment enclosure of claim 15, wherein the outer polymeric layer and the IPS layer each include a closeable flap.

22. The containment enclosure of claim 15, wherein the closeable flap is a zipper.

23. The containment enclosure of claim 15, wherein the outer polymeric layer and the IPS layer both include a center zipper.

24. The containment enclosure of claim 15, wherein the IPS layer is not attached to the inner polymeric layer.

25. The containment enclosure of claim 15, wherein (i) the outer polymeric layer forms a first bag-shaped enclosure, (ii) the IPS layer forms a second bag-shaped enclosure, and (iii) the inner polymeric layer forms a third bag-shaped enclosure.

* * * * *